United States Patent [19]

Gravert

[11] 4,318,227

[45] * Mar. 9, 1982

[54] DEVICE FOR DETERMINING PHYSICAL QUALITIES OF PRESSURIZED CONTAINER CONTENTS

[75] Inventor: William H. Gravert, Port Washington, N.Y.

[73] Assignee: Marine Moisture Control Company, Inc., Inwood, Long Island, N.Y.

[*] Notice: The portion of the term of this patent subsequent to Oct. 7, 1997, has been disclaimed.

[21] Appl. No.: 156,367

[22] Filed: Jun. 4, 1980

Related U.S. Application Data

[63] Continuation-in-part of Ser. No. 29,134, Apr. 11, 1979, Pat. No. 4,226,023.

[51] Int. Cl.³ .............................................. G01F 23/04
[52] U.S. Cl. ................................. 33/126.5; 73/343 R
[58] Field of Search ........ 33/126.5, 126.7 R, 126.7 A, 33/126.6; 73/314, 293, 290 B, 343 R; 105/377

[56] References Cited

U.S. PATENT DOCUMENTS

| | | | |
|---|---|---|---|
| 2,620,660 | 12/1952 | Goldsmith | 73/293 |
| 4,073,239 | 2/1978 | Adler | 105/377 |
| 4,226,023 | 10/1980 | Gravert | 33/126.5 |

*Primary Examiner*—Kyle L. Howell
*Assistant Examiner*—Denis E. Corr
*Attorney, Agent, or Firm*—Kerkam, Stowell, Kondracki & Clarke

[57] ABSTRACT

A device is provided for determining the physical qualities, such as amount, ullage, temperature, etc., of liquids, through an operable service hatch, of such tanks containing the liquid and vapors of the liquid and/or an inert gas above the liquid without lowering the pressure or allowing the pressurizing gas or vapors to escape to the atmosphere.

2 Claims, 3 Drawing Figures

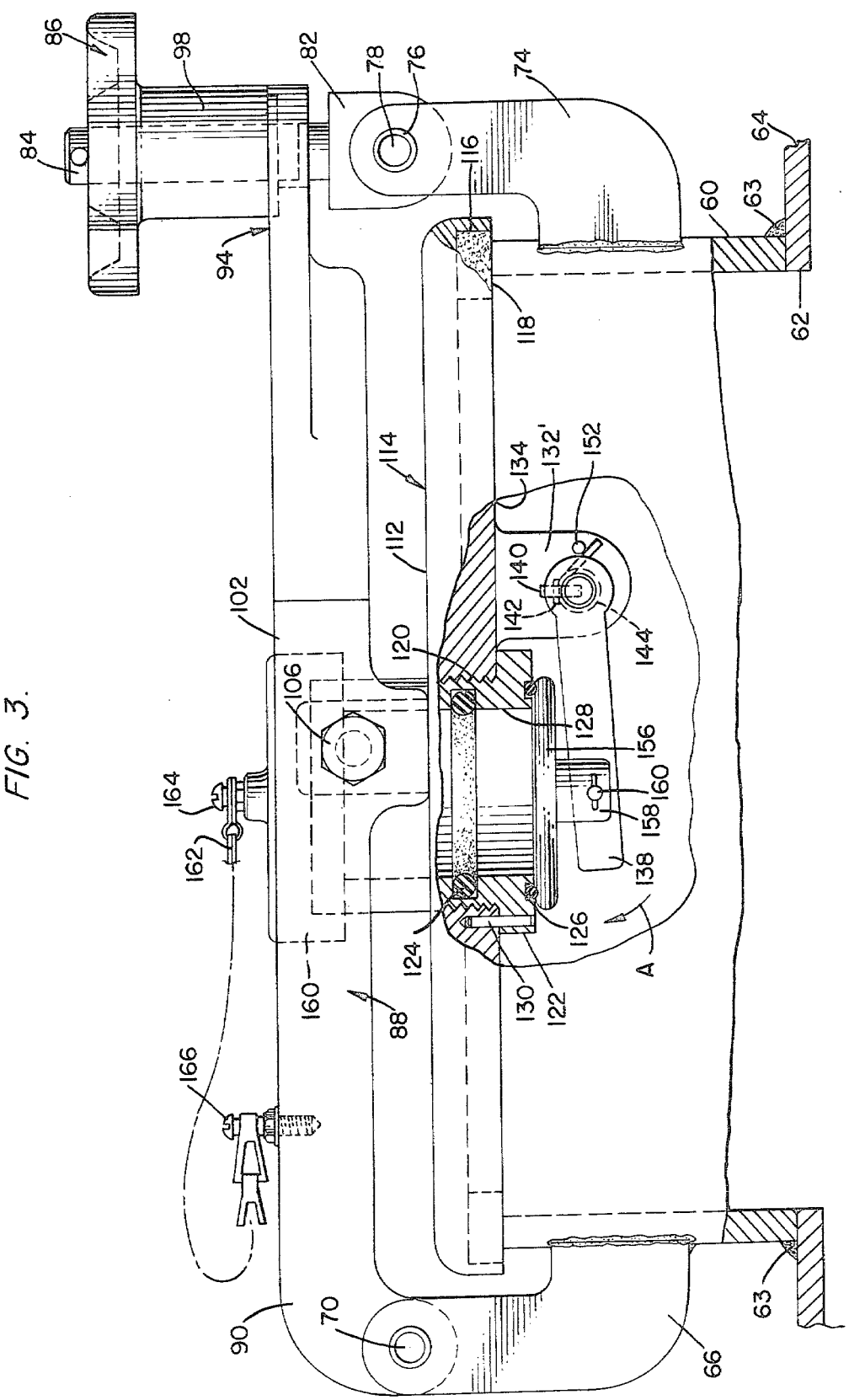

DEVICE FOR DETERMINING PHYSICAL QUALITIES OF PRESSURIZED CONTAINER CONTENTS

DESCRIPTION

CROSS-REFERENCE TO RELATED APPLICATION

This application is a continuation-in-part of my application Ser. No. 29,134 filed Apr. 11, 1979 now U.S. Pat. No. 4,226,023, issued 10/7/80.

TECHNICAL FIELD

This invention is directed to a system for hand gauging, including determining ullage, interface and temperature of liquids in pressurized tanks and containers without lowering the pressure in the tanks or containers or allowing vapors to escape therefrom to the atmosphere.

BACKGROUND OF PRIOR ART

The transporting of petroleum products on tank ships requires gauging the tanks on loading and before discharge to determine the quantities of product transported. The large quantities involved with their high costs eliminate the use of automatic gauging systems due to their large errors. The transfer of cargo is based on physical ullages measured with a tape by an independent gauger.

Portable ullage measuring devices providing a method of finding the surface of a liquid in a tank without visual sighting are well known and reference is made to my U.S. Pat. No. 4,123,753-W, H. Gravert, disclosing an accurate form of such device.

Ecology and vessel safety have added inert gas with closed loading and discharge practices to the transportation of cargoes. The new inert gas system pressurize the cargo tanks, making it impossible to guage a tank through the ullage port without first lowering the inert gas pressure. The excess inert gas and petroleum vapors are vented to atmosphere, then the tank is gauged by a hand tape using the edge of the ullage port as the standard reference. It is from this edge that the tank volume is calibrated.

It is also known to gauge and sample contents of pressurized tanks and reference is made to U.S. Pat. No. 2,284,396 W. Pfeiffer.

Systems such as disclosed in the Pfeiffer Patent require expensive duplication at each ullage port, or the transporting of a portion of heavy cumbersome equipment between ullage ports.

In my co-pending application there is disclosed and claimed a lightweight hand gauge mechanism in association with a tank outlet port sized to receive the gauging equipment.

BRIEF SUMMARY OF INVENTION

The present invention may be summarized as apparatus for gauging liquids in pressurized tanks having at least one sealable outlet port comprising in combination a portable hand-held measuring device and a valve housing assembly formed with a tank hatch to permit gauging of the liquid in the tank without interfering with the normal function of the hatch.

The hand-held measuring device comprises:

(a) a reel housing having a hand hold thereon;
(b) a fluid responsive device;
(c) a tape reel mechanism including a tape assembly having one end coupled with the fluid response device and the other end coupled with the tape reel mechanism;
(d) a second elongate hollow housing carried by the reel housing; the second housing adapted to receive a portion of the tape assembly and the fluid responsive device;
(e) means at the upper end of the second housing providing a gas seal for the tape assembly; and
(f) a stuffing nut engaging the external surface of the second housing.

A service opening into the tank to be gauged having a hatch ring secured thereabout; a hatch hinged to the hatch ring; means for latching the hatch to the hatch ring. An externally threaded neck carried by the hatch sized to be engaged by the stuffing nut carried by the second housing.

A valve seat is formed at the inner surface of the hatch about the threaded neck and a valve cap is pivotally mounted to the under surface of the hatch for movement from seating engagement with the valve seat to a position to permit entry of a portion of the second housing into the valve housing; and a spring urging the valve cap into sealing engagement with the valve seat.

BRIEF DESCRIPTION OF THE DRAWINGS

The invention will be more particularly described in reference to the drawing wherein:

FIG. 3 is an elevational view of the device shown in FIGS. 1 and 2 with the ullage tube removed.

DETAILED DESCRIPTION OF THE INVENTION

Figure 1:
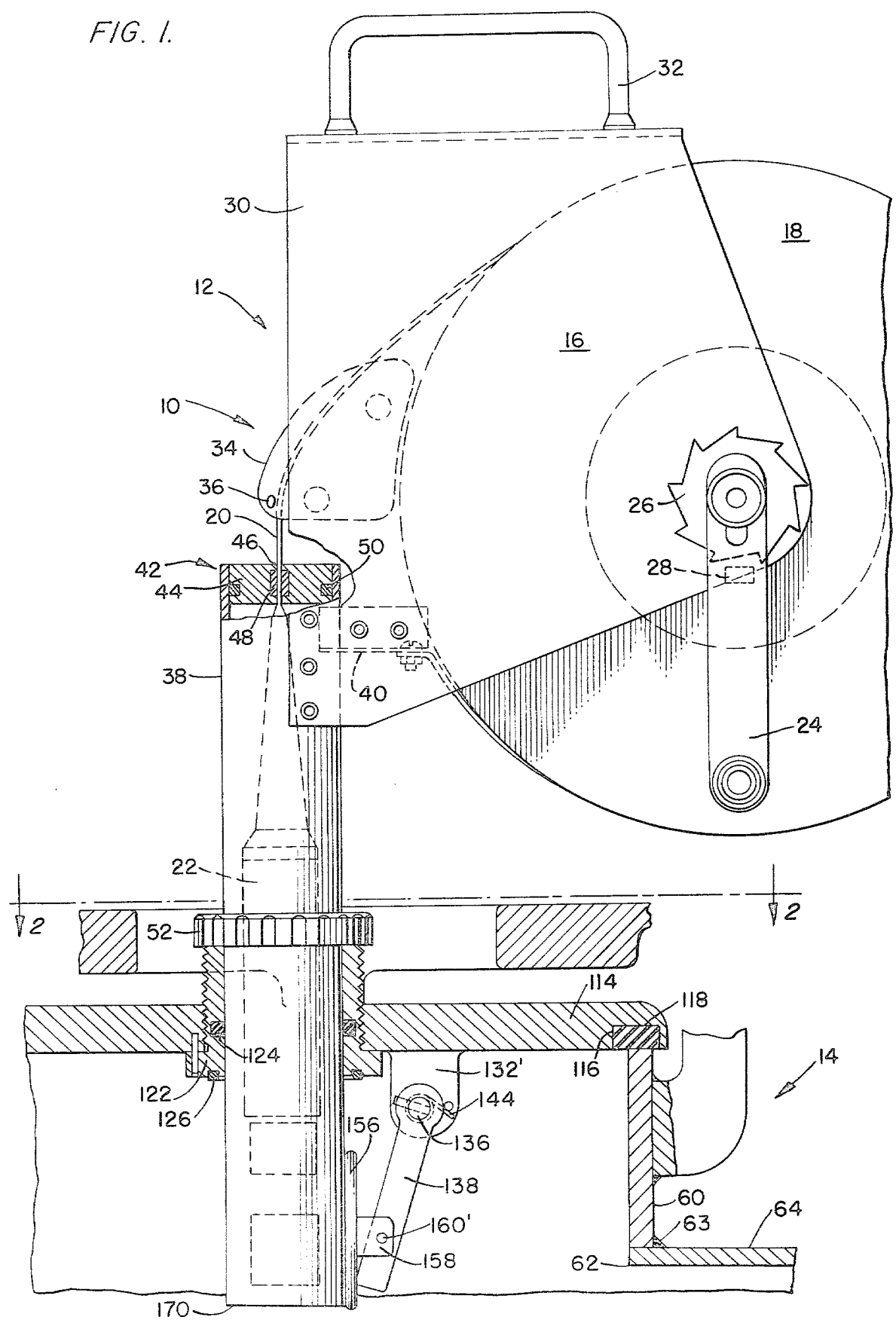
FIG. 1 is a partial side elevational view in partial section illustrating the apparatus for gauging liquids in pressurized tanks through a service hatch.

Referring to the drawing, 10 generally designates apparatus of the invention for gauging liquids in pressurized tanks having at least one sealable outlet port. As used herein, gauging liquids is intended to mean determining the ullage, the interface level of the contents of tanks, and the temperature of the contents at preselected levels and the like to define the total tank envelope, gross tank volume, and the like.

The apparatus of the invention includes in combination a portable hand-held measuring device 12, and a service hatch assembly 14.

HAND-HELD MEASURING DEVICE

The hand-held measuring device 12 includes a reel housing 16 having contained therein a reel mechanism 18 to which is attached one end of a tape assembly 20. The other end of the tape assembly is secured to the measuring or gauging device, or devices 22, which in the illustrated form of the invention comprises a sonic ullage measuring device which may be of the type disclosed and claimed in my U.S. Pat. No. 4,123,753 granted Oct. 31, 1978.

The reel mechanism 18 and in turn the tape 20 is controlled by the operator via a crank 24 which is slidably mounted on the reel shaft to provide locking means for the reel via star wheel 26 and locking lug 28. The measuring device 12 has attached to a portion 30 of the housing a hand carrying and steadying handle mechanism 32. Further, where the tape 20 pays out of the reel housing 16 is provided a tape guide 34 provided with a marker 36 which is designed to provide a point for reading ullage from the indicia appearing on the tape 20. The reel housing 16 also supports an elongate hollow second housing designated 38 via support arms 40. As particularly illustrated in FIG. 1 the tape 20 feeds through the interior of the second housing 38 having at its upper end 42 a sealing plug 44 having an opening therethrough as at 46. The sidewalls of the opening 46 have soft resilient inserts 48 engaging the surfaces of the tape 20 to thereby provide a gas seal for the tape without materially restricting the feed of the tape. The closure 44 is preferably provided with an O-ring 50 which provides a pressure seal at the upper end of the housing 38. The length of the housing 38 is such that it will completely enclose the particular measuring device 22 therein when the tape is reeled upon the reel mechanism 18. Mounted on the external surface of the housing 38 is a stuffing nut 52 having internal threads, the function of which will become more apparent hereinafter.

SERVICE HATCH ASSEMBLY

The service hatch assembly 14 includes a hatch ring 60 secured about opening 62, such as by welding as at 63, in a portion of the deck of a tanker, generally designated 64.

To one external side of the hatch ring 60 are welded a pair of spaced ears 66 and 66' which are bored as at 68 to receive a hinge pin 70. The hinge pin 70 is maintained in its bore 68 by means such as cotter keys 72 and 72'.

Diametrically opposed the pair of ears 66 and 66' are a pair of like ears 74 and 74' which are bored as at 76 to receive a pin 78. The pin 78 is bored as is pin 70 to receive cotter keys such as at 80. The pair of ears 74 and 74' have mounted therebetween a latch bolt 82 having an upper threaded stem 84 which threadily receives a star hand wheel generally designated 86. A yoke generally designated 88 has one end 90 bored as at 92, FIG. 2, to receive the center portion of the hinge pin 70 to thereby pivotally mount the yoke 88 to the pair of ears 66 and 66'. The opposite end 94 of the yoke 88 is furcated to provide a pair of spaced arms 96 and 96'. The spacing between the pair of furcations 96 and 96' are such that they are engageable by the stem 98 of the hand star wheel 86 when the star wheel is in the threaded relationship illustrated in FIGS. 2 and 3.

Figure 2:
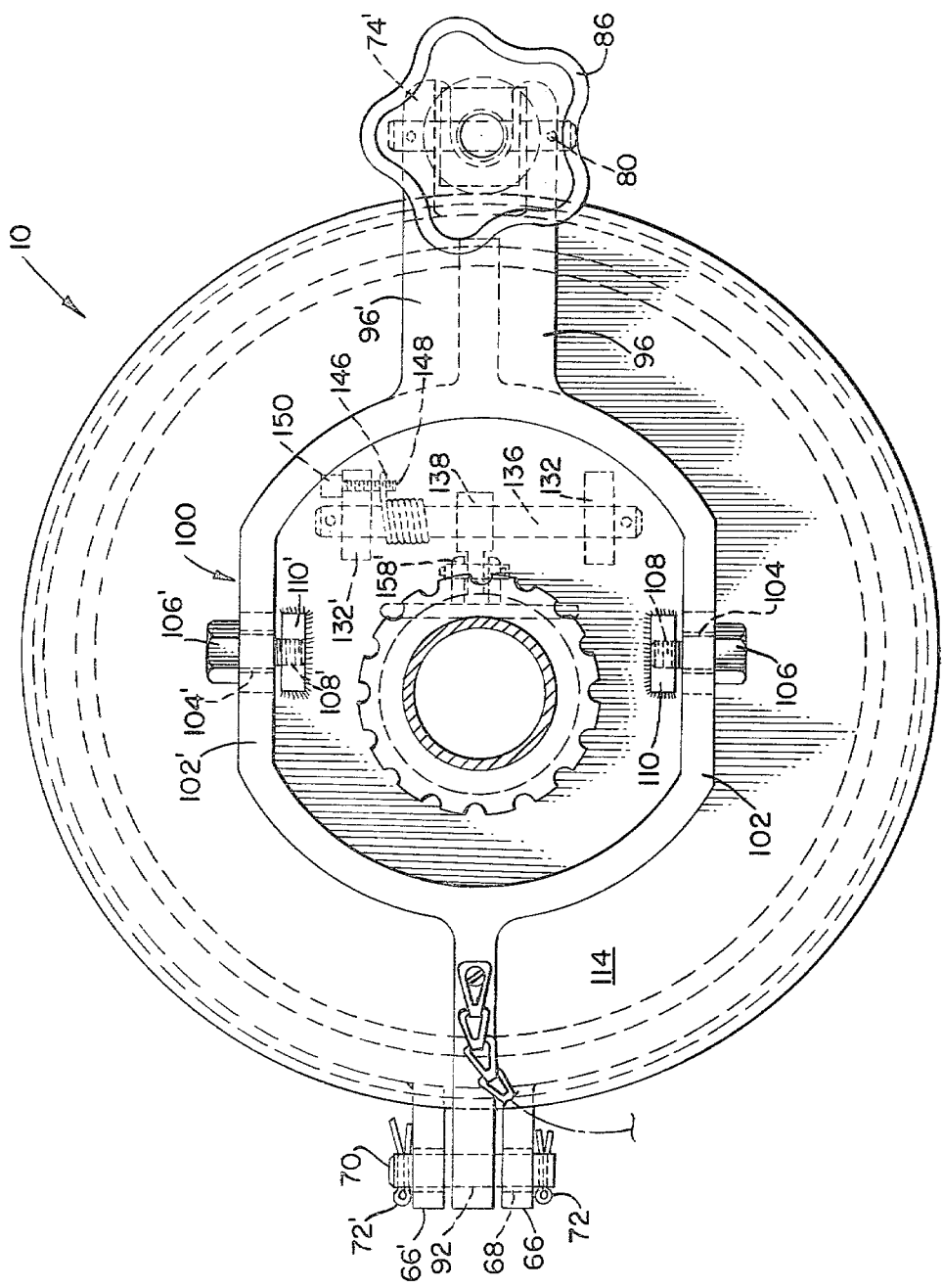
FIG. 2 is a top plan view of the structure shown in FIG. 1.

As more clearly illustrated in FIG. 2, the center section 100 of the yoke 88 splits to form two side rails 102 and 102'. The side rails 102 and 102' are bored as at 104 and 104' to receive shoulder bolts 106 and 106'. The shoulder bolts 106 and 106' are threadily received in threaded bores 108 and 108' in lifting pads 110 and 110'.

The lifting pads 110 and 110' are welded to the top surface 112 of the hatch generally designated 114.

The hatch is provided with a circular recess 116 which recess is filled with a packing 118 so that a seal is made between the hatch 114 and the hatch ring 60. Centrally of the hatch is a threaded bore 120 which threadily receives a throat 122 which throat is provided with an internal O-ring 124 and a bottom O-ring 126. The diameter of the bore or opening 128 in the throat 122 is such that the second housing 38 will be snugly received therein and a tight gas and liquid seal is made between the outer surface of the housing 38 and the O-ring 124. After the throat is tightly received in its threaded bore 120 in the hatch 114 the throat is pinned therein via pin 130 to prevent relative movement between the throat and the hatch.

The hatch also carries a pair of spaced apart bushing pads 132 and 132'. The pair of bushing pads 132 and 132' are welded to the inner face 134 of the hatch 114 or integrally cast therewith.

Each of the bushing pads 132 and 132' is bored to receive a pin 136 which pin has keyed thereto a valve actuating arm 138 and the pin 136 is bored to receive a pin 140 which bears against one end 142 of a helical spring 144. The opposite end 146 of the spring 144 bears against end 148 of a screw 150 threadily received in a bore 152 in the bushing pad 132' whereby the pin 136 and its attached valve actuating arm 138 are continuously urged in the direction of directional arrow A, FIG. 3 of the drawing.

A valve seat 156 is provided with a pair of pads 158 and 158' and the arm and each of the pads 158 and 158' are bored to receive a pin 160' therethrough which pin is cotterkeyed at its outboard ends to provide limited pivotal movement to the valve seat 158 which is shown in the sealed position in FIG. 3 and the open position in FIGS. 1 and 2.

The assembly is completed by providing external threads on the neck 122 which external threads mate with internal threads on a packed cap 160 which cap is connected by chain 162 via screw 164 and screw 166 to the yoke 88.

In a preferred embodiment the tape 20 is coated with an electrical conductive plastic to reduce the chances of electrical sparks during ullage.

Oil tanks contain high static electricity charges at times. Whenever the product is disturbed, high static charges are formed in the vapor space above the liquid. The ullage tape has to pass through the area to reach the surface and during this passage the tape picks up a charge. The conductive plastic coated tape will drain off the charge to the tape frame, then through the seat 122 to earth. Safety dictates that there must not be a spark at the time the tube 170 enters or leaves the tank. The spark is eliminated with this device using the following procedure:

The barrel 170 touches the seat 122 as it is inserted into the tank. Any spark at this time cannot effect the tank as the check valve 156 is still closed. When the barrel 170 is withdrawn from the tank, the check valve 156 is closed before the electrical contact is broken.

OPERATION

In operation of the tank measuring device of the invention affixed to the tape 20 is the desired measuring device 22.

The cap 160 is removed from the external threads of the neck 122 and the operator presses the cylindrical housing 38 into the neck to seal against O-ring 124. Continued downward motion after contact between the lower edge 170 with the upper surface of the valve cap 156 forces the valve cap downwardly against the tension in spring 144. Downward motion is continued until the valve is fully opened and the stuffing nut 52 is tightened on the threads of the neck 122. The measuring device can now be lowered into the tank to be measured by the hand crank 24 and the appropriate readings obtained. To remove the tape reel element 12 a reverse procedure is followed, and after the stuffing nut 52 is unthreaded from the threaded neck 122 the tube 38 and its attached reel assembly are lifted from the service hatch 114 and in so doing spring 144 causes the valve cap 156 to move upwardly and finally to seal against the O-ring 126.

It will be recognized that with the O-ring seals 124, 126, and 50, and tape seal 48, the operator and the environment are protected against pressure gases and vapors maintained in the tank to be measured.

STATEMENT OF INDUSTRIAL APPLICATION

The present invention provides means whereby tanks pressurized by inert gases or under pressure by vaporized hydrocarbons may be measured without reducing the pressure within the tank.

I claim:

1. Apparatus for gauging liquids in pressurized tanks through a service hatch comprising in combination a portable handl-held measuring device and a valve housing assembly secured to the tank outlet port at each station to be gauged, said hand-held measuring device comprising:
   a reel housing having a hand hold thereon;
   a fluid responsive device;
   a tape reel mechanism including a tape assembly having one end coupled with the fluid response device and the other end coupled with said tape reel mechanism;
   a second elongate hollow housing carried by the reel housing; said second housing being adapted to receive a portion of the tape assembly and the fluid responsive device;
   means at the upper end of the second housing providing a gas seal for the tape assembly;
   a stuffing nut engaging the external surface of the second housing;
   a service opening into the tank to be gauged having a hatch ring secured thereabout;
   a hatch hinged to the hatch ring;
   means for latching the hatch to the hatch ring;
   an externally threaded neck carried by the hatch sized to be engaged by the stuffing nut carried by the second housing;
   a valve seat is formed at the inner surface of the hatch about the threaded neck;
   a valve cap is pivotally mounted to the under surface of the hatch for movement from seating engagement with the valve seat to a position to permit entry of a portion of the second housing into the valve housing; and
   a spring urging the valve cap into sealing engagement with the valve seat.

2. The invention defined in claim 1 further including sealing means at the upper end of the elongate housing engaging the tape assembly as it moves through the housing.

* * * * *